(12) United States Patent
Kim et al.

(10) Patent No.: US 11,798,467 B2
(45) Date of Patent: Oct. 24, 2023

(54) LIGHT EMITTING DISPLAY APPARATUS

(71) Applicant: LG Display Co., Ltd., Seoul (KR)

(72) Inventors: JungChul Kim, Paju-si (KR);
HoYoung Lee, Paju-si (KR);
Sungwook Chang, Paju-si (KR);
Jaesung Kim, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 17/958,541

(22) Filed: Oct. 3, 2022

(65) Prior Publication Data
US 2023/0115779 A1    Apr. 13, 2023

(30) Foreign Application Priority Data
Oct. 7, 2021   (KR) .......................... 10-2021-0133235

(51) Int. Cl.
*G09G 3/32* (2016.01)
(52) U.S. Cl.
CPC ....... *G09G 3/32* (2013.01); *G09G 2300/0842* (2013.01); *G09G 2310/061* (2013.01); *G09G 2320/0247* (2013.01)
(58) Field of Classification Search
CPC ............. G09G 3/32; G09G 2300/0842; G09G 2310/061; G09G 2320/0247
See application file for complete search history.

(56) References Cited

U.S. PATENT DOCUMENTS

| 10,964,262 | B1* | 3/2021 | Lin | ...................... | G09G 3/2022 |
| 2018/0061311 | A1* | 3/2018 | Lin | ...................... | G09G 3/3291 |
| 2020/0160788 | A1* | 5/2020 | Son | ...................... | G09G 3/2003 |
| 2023/0080809 | A1 | 3/2023 | Ono et al. | | |

FOREIGN PATENT DOCUMENTS

WO    2022/125260 A1    6/2022

OTHER PUBLICATIONS

GB Search Report dated Mar. 23, 2023 issued in corresponding UK Patent Application No. GB2214364.8.

* cited by examiner

*Primary Examiner* — Andrew Sasinowski
(74) *Attorney, Agent, or Firm* — Morgan, Lewis & Bockius LLP

(57) ABSTRACT

A light emitting display apparatus includes a pixel driving circuit including a driving transistor and an anode reset capacitor connected to a gate of the driving transistor and a light emitting device configured to emit light with a current supplied through the driving transistor. An anode reset period, where a data voltage is not supplied to the driving transistor, is between refresh periods where the light emitting device emits the light with the data voltage supplied to the driving transistor, and an anode reset voltage supplied to the anode reset capacitor in the refresh period is higher than an initial voltage which is input to the gate of the driving transistor in the refresh period.

9 Claims, 15 Drawing Sheets

LIGHT EMITTING DISPLAY APPARATUS

CROSS-REFERENCE TO RELATED APPLICATIONS

This application claims the benefit of the Korean Patent Application No. 10-2021-0133235 filed on Oct. 7, 2021, which is hereby incorporated by reference as if fully set forth herein.

BACKGROUND

Technical Field

The present disclosure relates to a light emitting display apparatus.

Discussion of the Related Art

In light emitting display apparatuses of the related art driven at a variable refresh rate (VRR), a change in luminance may occur due to hysteresis of a driving transistor. Particularly, when hysteresis is large, flickers may be recognized in a low frequency domain (for example, 30 Hz or less).

SUMMARY

Accordingly, embodiments of the present disclosure are directed to a light emitting display apparatus that substantially obviates one or more problems due to limitations and disadvantages of the related art.

An aspect of the present disclosure is to provide a light emitting display apparatus in which an anode reset voltage applied to a gate of a driving transistor in an anode reset period is higher than an initial voltage which is input to the gate of the driving transistor in a refresh period where a light emitting device is driven to emit light.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a light emitting display apparatus comprises a pixel driving circuit including a driving transistor and an anode reset capacitor connected to a gate of the driving transistor and a light emitting device configured to emit light with a current supplied through the driving transistor, wherein an anode reset period, where a data voltage is not supplied to the driving transistor, is between refresh periods where the light emitting device emits the light with the data voltage supplied to the driving transistor, and an anode reset voltage supplied to the anode reset capacitor in the anode reset period is higher than an initial voltage which is input to the gate of the driving transistor in the refresh period.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure.

Figure 1:
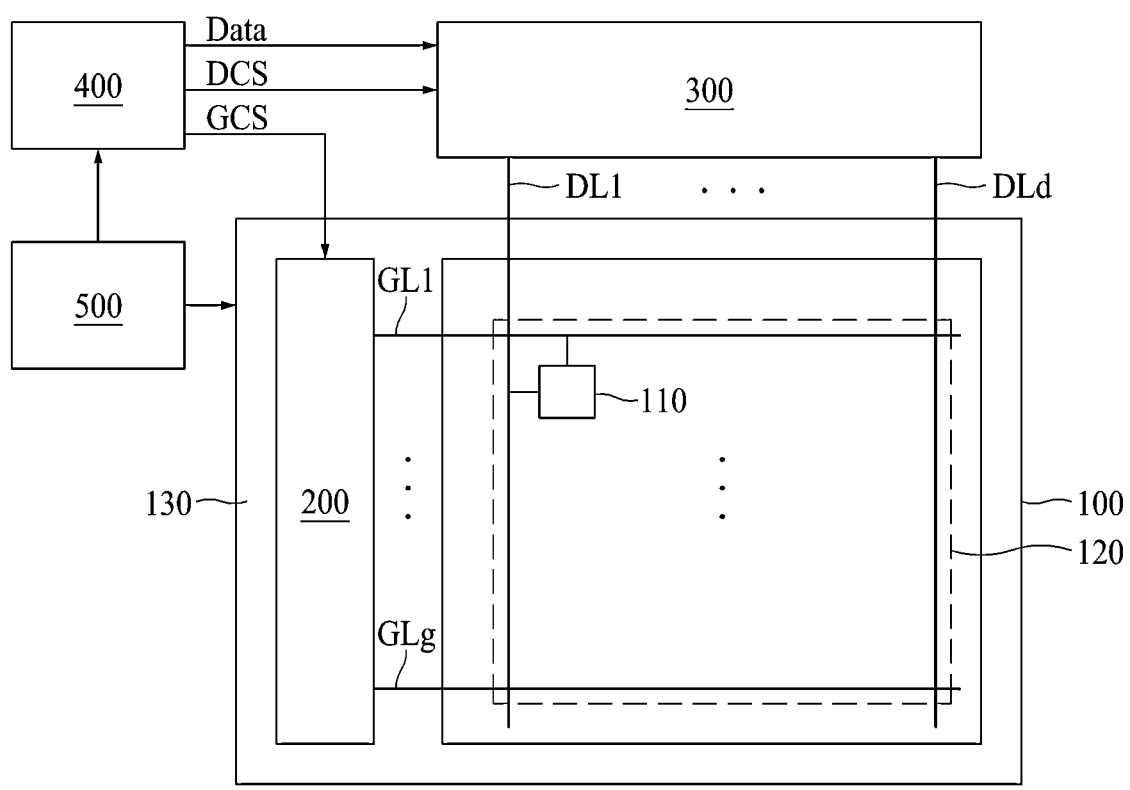
FIG. 1 illustrates a configuration of a light emitting display apparatus according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Further, the present disclosure is only defined by scopes of claims.

A shape, a size, a ratio, an angle, and a number disclosed in the drawings for describing embodiments of the present disclosure are merely an example, and thus, the present disclosure is not limited to the illustrated details. Like reference numerals refer to like elements throughout. In the following description, when the detailed description of the relevant known function or configuration is determined to unnecessarily obscure the important point of the present disclosure, the detailed description will be omitted. When "comprise," "have," and "include" described in the present specification are used, another part may be added unless "only" is used. The terms of a singular form may include plural forms unless referred to the contrary.

In construing an element, the element is construed as including an error or tolerance range although there is no explicit description of such an error or tolerance range.

In describing a position relationship, for example, when a position relation between two parts is described as, for example, "on," "over," "under," and "next," one or more other parts may be disposed between the two parts unless a more limiting term, such as "just" or "direct(ly)" is used.

In describing a time relationship, for example, when the temporal order is described as, for example, "after," "subsequent," "next," and "before," a case that is not continuous may be included unless a more limiting term, such as "just," "immediate(ly)," or "direct(ly)" is used.

It will be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In describing elements of the present disclosure, the terms "first," "second," "A," "B," "(a)," "(b)," etc. may be used. These terms are intended to identify the corresponding elements from the other elements, and basis, order, or number of the corresponding elements should not be limited by these terms. The expression that an element is "connected," "coupled," or "adhered" to another element or layer the element or layer can not only be directly connected or adhered to another element or layer, but also be indirectly connected or adhered to another element or layer with one or more intervening elements or layers "disposed," or "interposed" between the elements or layers, unless otherwise specified.

The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item.

Features of various embodiments of the present disclosure may be partially or overall coupled to or combined with each other, and may be variously inter-operated with each other and driven technically as those skilled in the art can sufficiently understand. The embodiments of the present disclosure may be carried out independently from each other, or may be carried out together in co-dependent relationship.

Hereinafter, embodiments of the present disclosure will be described in detail with reference to the accompanying drawings. For convenience of description, a scale of each of elements illustrated in the accompanying drawings differs from a real scale, and thus, is not limited to a scale illustrated in the drawings.

Figure 2:
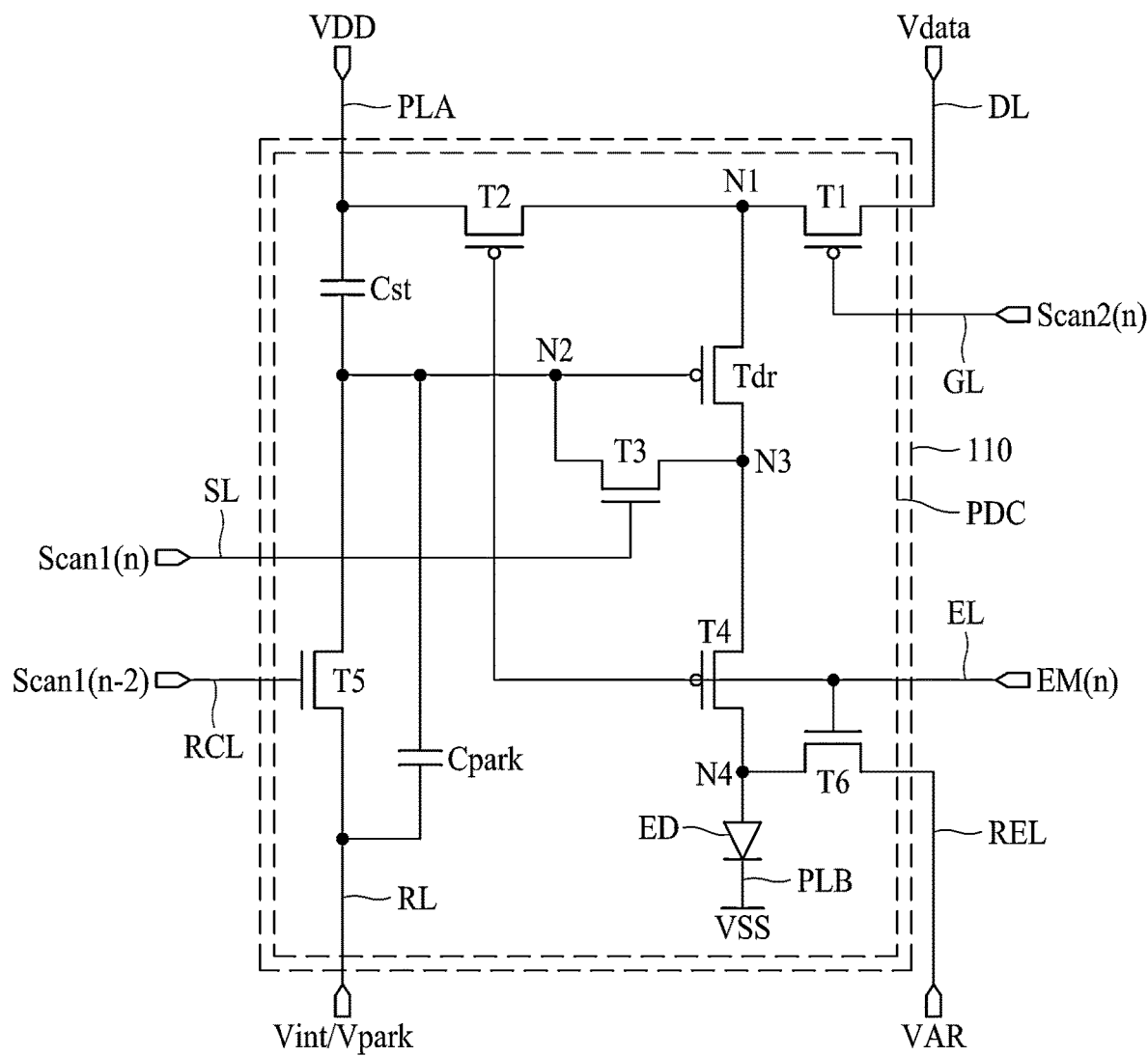
FIG. 2 illustrates a configuration of a pixel applied to a light emitting display apparatus according to an embodiment of the present disclosure.
Figure 3:
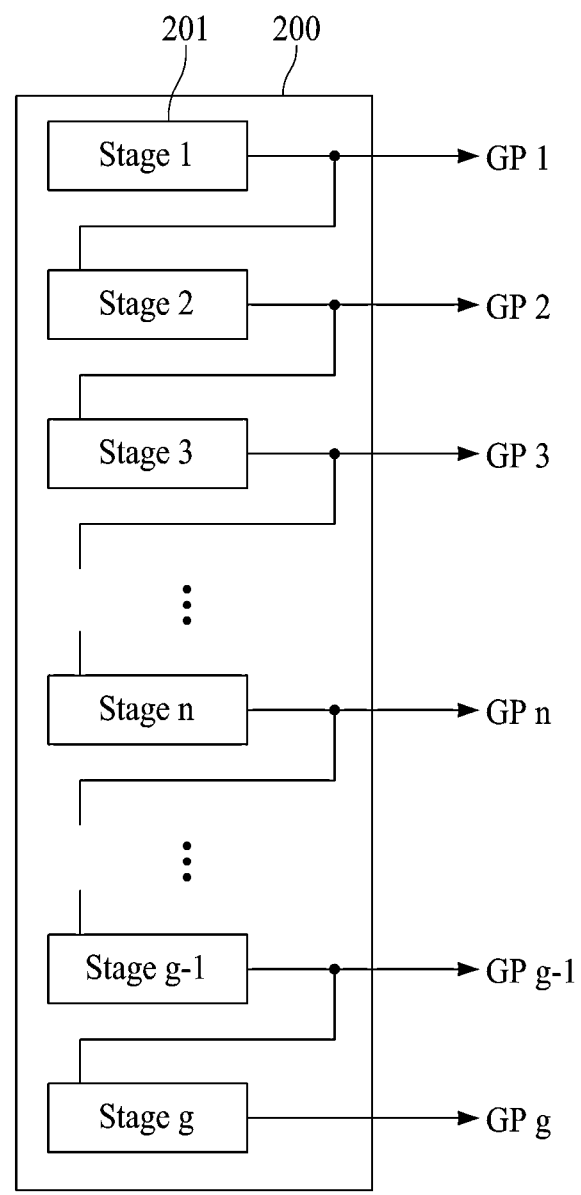
FIG. 3 illustrates a configuration of a gate driver applied to a light emitting display apparatus according to an embodiment of the present disclosure.
Figure 4:
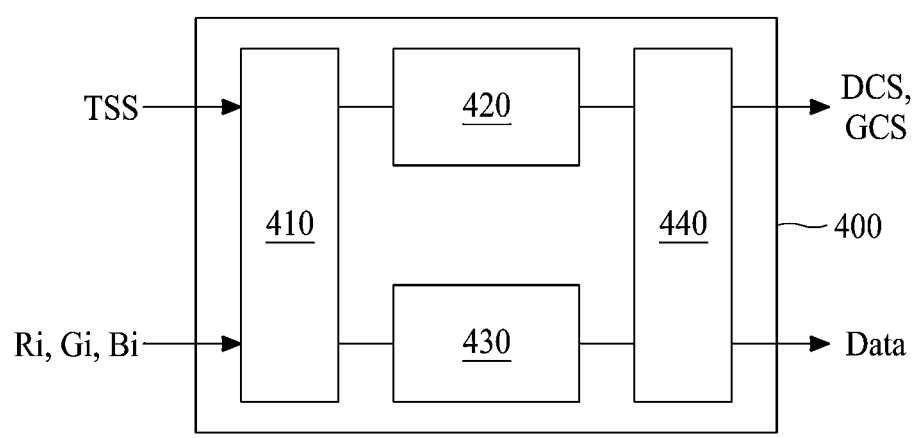
FIG. 4 illustrates a configuration of a controller applied to a light emitting display apparatus according to an embodiment of the present disclosure.

FIG. 1 illustrates a configuration of a light emitting display apparatus according to an embodiment of the present disclosure. FIG. 2 illustrates a configuration of a pixel applied to a light emitting display apparatus according to an embodiment of the present disclosure. FIG. 3 illustrates a configuration of a gate driver applied to a light emitting display apparatus according to an embodiment of the present disclosure. FIG. 4 illustrates a configuration of a controller applied to a light emitting display apparatus according to an embodiment of the present disclosure.

As illustrated in FIGS. 1 and 2, the light emitting display apparatus according to an embodiment of the present disclosure may include a display panel 100 which includes a light emitting device ED emitting light and a plurality of pixels 110 each including a pixel driving circuit PDC driving the light emitting device ED, a gate driver 200 which supplies gate pulses (or gate signals) to a plurality of gate lines GL1 to GLg included in the display panel 100, a data driver 300 which supplies data voltages to a plurality of data lines DL1 to DLd included in the display panel 100, a controller 400 which controls the gate driver 200 and the data driver 300, and a power supply 500 which supplies power.

The display panel 100 may be divided into a display area 120 which displays an image and a non-display area 130 which surrounds an outer portion of the display area.

The gate lines GL1 to GLg and the data lines DL1 to DLd may be included in the display panel 100. A gate line and a data line may be connected to each of the pixels 110. The gate lines GL1 to GLg may be connected to the gate driver 200, and the data lines DL1 to DLd may be connected to the data driver 300. Here, g and d may each be a natural number.

Each of the pixels 110 included in the display panel 100, as illustrated in FIG. 2, may include the pixel driving circuit PDC and a light emitting area.

The pixel driving circuit PDC may include first to sixth transistors T1 to T6, a storage capacitor Cst, a driving transistor Tdr, and an anode reset capacitor Cpark, and the light emitting area may include the light emitting device ED.

The light emitting device ED may include one of an organic light emitting layer, an inorganic light emitting layer, and a quantum dot light emitting layer, or may include a stack or combination structure of an organic light emitting layer (or an inorganic light emitting layer) and a quantum dot light emitting layer.

The light emitting device ED may emit light corresponding to one of various colors such as red, green, and blue, or may emit white light.

The pixel driving circuit PDC may include a first transistor T1 which includes a first terminal, a gate connected to a gate line GL, and a second terminal connected to a data line DL, a second transistor T2 which includes a first terminal connected to a first voltage supply line PLA through which a first voltage VDD is supplied, a second terminal connected to the first terminal of the first transistor T1, and a gate connected to an emission line EL, a driving transistor Tdr which includes a first terminal connected to the first terminal of the first transistor, a second terminal, and a gate, a third transistor T3 which includes a first terminal connected to the gate of the driving transistor, a second terminal connected to the second terminal of the driving transistor, and a gate connected to a scan line SL, a fourth transistor T4 which includes a first terminal connected to the second terminal of the driving transistor, a gate connected to the emission line EL, and a second terminal connected to the light emitting device ED, a fifth transistor T5 which includes a first terminal connected to the gate of the driving transistor, a second terminal connected to an anode reset line RL through which an anode reset voltage Vpark is supplied, and a gate connected to a reset control line RCL, a sixth transistor T6 which includes a first terminal connected to the second terminal of the fourth transistor, a second terminal connected to a reference voltage line REL through which a reference voltage VAR is supplied, and a gate connected to the emission line EL, a storage capacitor Cst provided between the first terminal of the second transistor and the first terminal of the fifth transistor, and an anode reset capacitor Cpark provided between the gate of the driving transistor and the second terminal of the fifth transistor.

The first transistor T1 may be turned on or off by a gate signal Scan2($n$) (where n is a natural number) supplied through a gate line GL, and a data voltage Vdata supplied through a data line DL may be supplied to the driving transistor Tdr when the first transistor T1 is turned on. The gate signal Scan2($n$) may include a gate pulse for turning on the first transistor T1 and a gate-off signal for turning off the first transistor T1. The first transistor T1 may be a P-type low temperature polysilicon (LTPS) transistor.

The second transistor T2, the fourth transistor T4, and the sixth transistor T6 may be turned on or off by an emission signal EM(n) supplied through the emission line EL. The emission line EL may be arranged in parallel with the gate line GL. The second transistor T2 and the fourth transistor T4 may each be a P-type LTPS transistor, and the sixth transistor T6 may be an N-type oxide transistor. For example, the pixel driving circuit PDC applied to the present disclosure may include at least one P-type LTPS transistor and at least one N-type oxide transistor.

The third transistor T3 may be turned on or off by a scan signal Scan1($n$) supplied through the scan line SL. The scan line SL may be arranged in parallel with the gate line GL. The third transistor T3 may be an N-type oxide transistor.

The fifth transistor T5 may be turned on or off by a reset control signal Scan1($n$−2) supplied through the reset control line RCL. The reset control line RCL may be arranged in parallel with the gate line GL. The fifth transistor T5 may be an N-type oxide transistor.

The driving transistor Tdr may be driven with a data voltage Vdata and may control the amount of current supplied to the light emitting device ED. The driving transistor Tdr may be a P-type LTPS transistor.

The storage capacitor Cst may be provided between the first terminal of the second transistor T2 and the first terminal of the fifth transistor T5.

The anode reset capacitor Cpark may be provided between the gate of the driving transistor Tdr and the anode reset line RL through which an initial voltage (or initialization voltage) Vint or the anode reset voltage Vpark is supplied. For example, the anode reset capacitor Cpark may be provided between the second terminal of the fifth transistor T5 and the gate of the driving transistor Tdr. A capacitance of the anode reset capacitor Cpark may be set to 1/10 or less of a capacitance of the storage capacitor Cst.

The first voltage VDD may be supplied to the driving transistor Tdr and the light emitting device ED through the first voltage supply line PLA.

The second voltage VSS may be supplied to the light emitting device ED through the second voltage supply line PLB.

The reference voltage VAR may be supplied to the sixth transistor T6 through the reference voltage line REL The initial voltage Vint may be supplied to the gate of the driving transistor Tdr through the anode reset line RL and the fifth transistor T5.

The anode reset voltage Vpark may be supplied to the anode reset capacitor Cpark through the anode reset line RL and may affect a voltage at the gate of the driving transistor Tdr.

Hereinafter, a light emitting display apparatus including the pixels 110 having a structure illustrated in FIG. 2 will be described as an example of the present disclosure. However, the present disclosure is not limited to the pixel 110 illustrated in FIG. 2.

The data driver 300 may supply data voltages Vdata to the data lines DL1 to DLd.

The data driver 300 may be provided on a chip-on film attached on the display panel 100. Also, the data driver 300 may be directly equipped in the display panel 100 and may be connected to the controller 400 mounted on a main substrate.

The data driver 300 may be implemented as one integrated circuit (IC) together with the controller 400. In this case, the IC may be provided on the chip-on film, or may be directly equipped in the display panel 100.

The gate driver 200 may supply gate pulses to the gate lines GL1 to GLg.

The gate driver 200 may be implemented as an IC and may be mounted in the non-display area 130. Also, the gate driver 200 may be directly embedded into the non-display area 130 by using a gate-in panel (GIP) type. In a case where the GIP type is used, transistors configuring the gate driver 200 may be provided in the non-display area 130 through the same process as transistors included in each of the pixels 110.

When the gate pulse generated by the gate driver 200 is supplied to the gate of the first transistor T1 provided in the pixel 110 through the gate line GL, the first transistor T1 may be turned on. When the first transistor T1 is turned on, the data voltage Vdata supplied through the data line DL may be supplied to the pixel 110. When a gate-off signal is supplied to the first transistor T1, the first transistor T1 may be turned off. When the first transistor T1 is turned off, the data voltage Vdata may not be supplied to the pixel 110 any longer. A gate signal Scan2($n$) supplied to the gate line GL may include the gate pulse and the gate-off signal.

In order to supply the gate pulses to the gate lines GL1 to GLg, as illustrated in FIG. 3, the gate driver 200 may include a plurality of stages 201 which supply gate pulses GP1 to GPg to the gate lines GL1 to GLg connected to the pixels 110.

Each of the stages 201 may further generate the emission signal EM(n) and the scan signal Scan1($n$) as well as the gate pulses. The emission signal EM(n) may be output to the emission line EL, and the scan signal Scan1($n$) may be output to the scan line SL.

To this end, each of the stages 201 may include a plurality of transistors.

In the above description, the gate signal Scan2($n$), the scan signal Scan1($n$), and the emission signal EM(n) may be signals which are output from an $n^{th}$ stage, and a reset control signal Scan1($n$−2) may be a signal which is output from an n−$2^{th}$ stage.

The reset control signal Scan1($n$−2) may be a scan signal which is supplied to pixels connected to the n−$2^{th}$ stage through an n−$2^{th}$ gate line. For example, a signal output from the n−$2^{th}$ stage may be a scan signal which is supplied to pixels connected to the n−$2^{th}$ stage through the n−$2^{th}$ gate line, and moreover, may be a reset control signal which is supplied to pixels connected to the $n^{th}$ stage through an $n^{th}$ gate line.

The controller 400 may realign pieces of input image data Ri, Gi, and Bi transmitted from an external system by using a timing synchronization signal TSS transmitted from the external system, and a gate control signal GCS to be supplied to the gate driver 200 and a data control signal DCS to be supplied to the data driver 300 may be generated.

To this end, as illustrated in FIG. 4, the controller 400 may include a data aligner 430 which realigns the pieces of input image data Ri, Gi, and Bi to generate pieces of image data Data and supplies the pieces of image data Data to the data driver 300, a control signal generator 420 which generates the gate control signal GCS and the data control signal DCS by using the timing synchronization signal TSS, an input unit 410 which receives the timing synchronization signal TSS and the pieces of input image data Ri, Gi, and Bi transmitted from the external system, transfers the pieces of input image data Ri, Gi, and Bi to the data aligner 430, and transfers the timing synchronization signal TSS to the control signal generator 420, and an output unit 440 which supplies the data driver 300 with pieces of image data Data generated by the data aligner 430 and the data control signal DCS generated by the control signal generator 420 and outputs the gate control signal GCS, generated by the control signal generator 420, to the gate driver 200.

Here, the external system may perform a function of driving the controller 400 and an electronic device including the light emitting display apparatus according to an embodiment of the present disclosure. For example, when the electronic device is a television (TV), the external system may receive various kinds of sound information, image information, and letter information over a communication network and may transfer the received image information to the controller 400. In this case, the image information may include the pieces of input image data Ri, Gi, and Bi.

The power supply 500 may supply power to the gate driver 200, the data driver 300, and the controller 400.

Moreover, the power supply 500 may supply pixel driving circuits PDC with various powers (for example, the first voltage VDD, the second voltage VSS, the initial voltage Vint, the anode reset voltage Vpark, and a compensation voltage Vobs) needed for the pixel driving circuits PDC included in the display panel 100.

Figure 5:
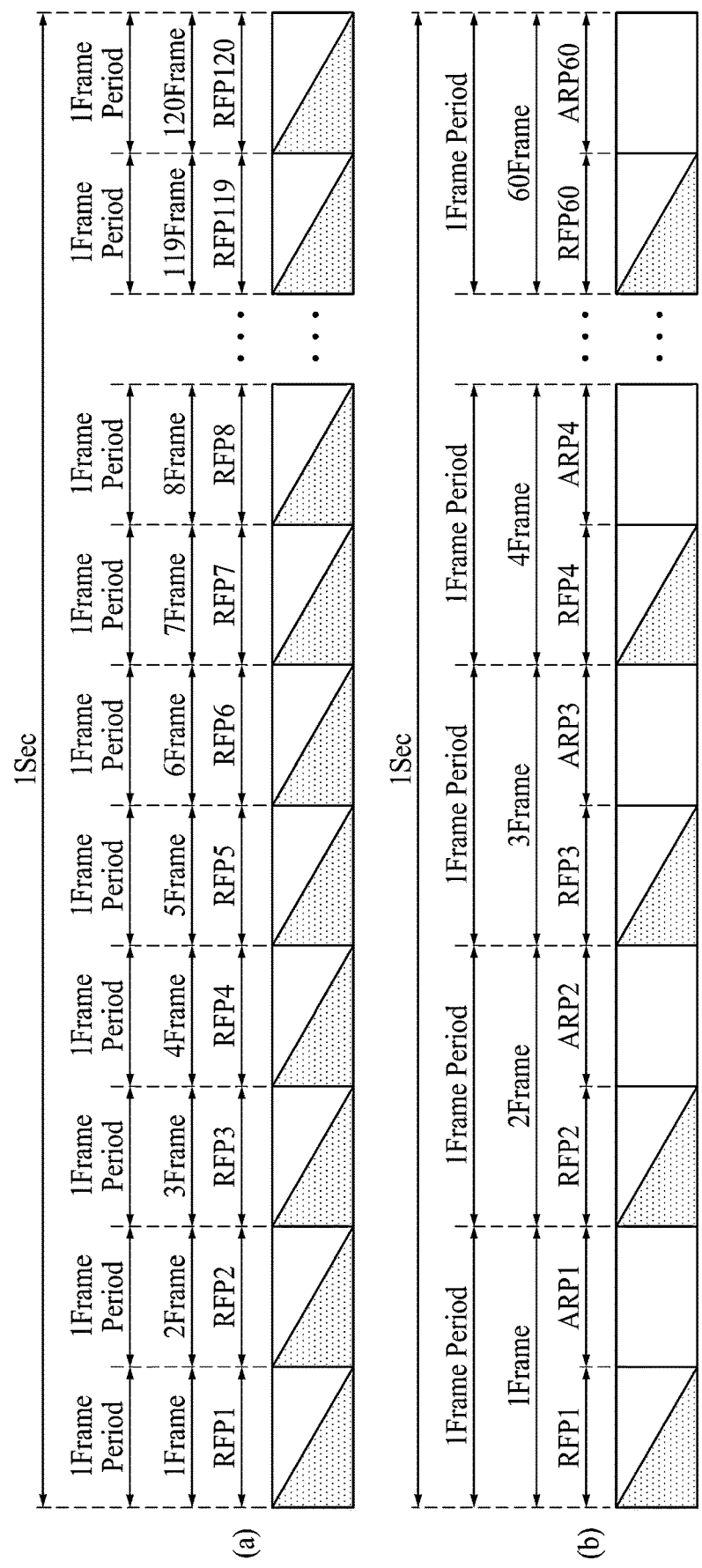
FIGS. 5 and 6 illustrate an operating method of a light emitting display apparatus according to an embodiment of the present disclosure.
Figure 6:
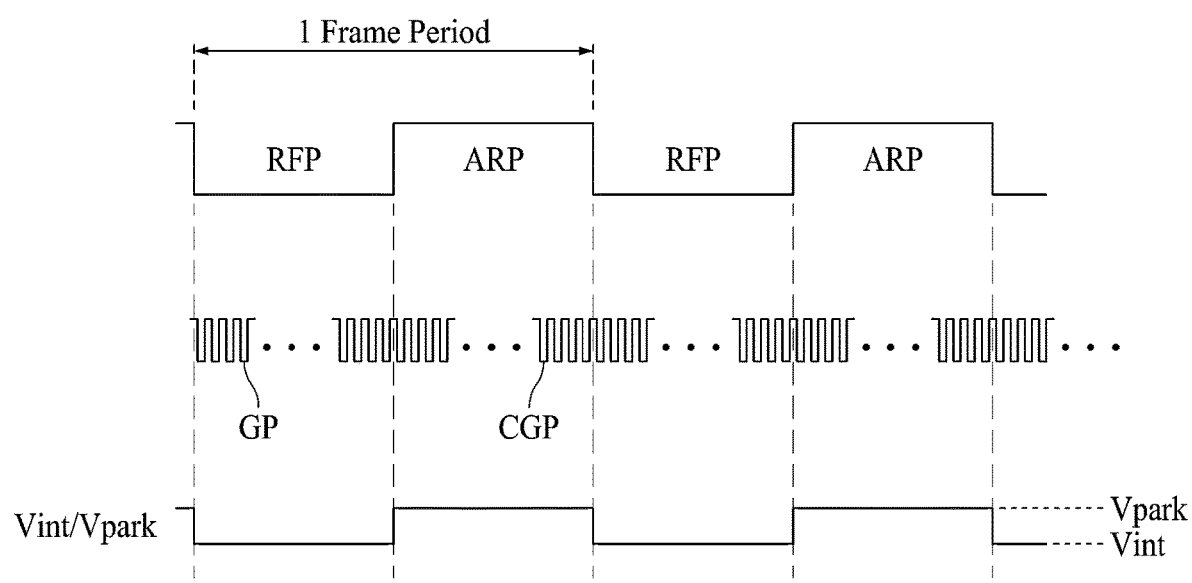

FIGS. 5 and 6 illustrate an operating method of a light emitting display apparatus according to an embodiment of the present disclosure. Particularly, FIG. 5($a$) is for describing an operating method of an experimental light emitting display apparatus, FIG. 5($b$) is for describing an operating method of a light emitting display apparatus according to an embodiment of the present disclosure, and FIG. 6 illustrates in detail two of frames illustrated in FIG. 5($b$).

In the following description, one frame period may denote a period where gate pulses GP1 to GPg are supplied to the gate lines GL1 to GLg included in the display panel 100, and thus, one image is displayed by the display panel 100. Also, a frame may denote one image. To provide an additional description, in FIG. 5, one frame and two frames may denote different images, or may be defined for determining a timing at which data voltages Vdata for displaying one image are output. For example, in FIG. 5, a period corresponding to each of 1 to 120 frames (or 60 frames) may be one frame period. For example, as illustrated in FIG. 5($b$), that the light emitting display apparatus according to an embodiment of the present disclosure is driven at 60 Hz may denote that one frame period is repeated 60 times for 1 sec, and one frame period may include a refresh period RFP and an anode reset period ARP.

For example, as illustrated in FIG. 5($b$) and FIG. 6, one frame period may include the refresh period RFP where light emitting devices ED are driven by the gate pulses GP1 to GPg supplied to the gate lines GL1 to GLg to emit light and the anode reset period ARP where the light emitting devices ED maintain an emissions state. The anode reset period ARP may be set to be greater than or equal to the refresh period RFP.

In the refresh period RFP in one frame period, the gate pulses GP1 to GPg may be supplied to the gate lines GL1 to GLg, and thus, one image may be displayed by the display panel 100. In the anode reset period ARP in one frame period, an image displayed in the refresh period RFP may be seen with eyes of a user. For example, data voltages may be supplied to the data lines in the refresh period RFP.

A result obtained by comparing a light emitting display apparatus of the related art with the light emitting display apparatus according to an embodiment of the present disclosure will be described below.

For example, in a case where the light emitting display apparatus of the related art displaying an image in the anode reset period ARP illustrated in FIG. 6 is driven at 120 Hz, as illustrated in FIG. 6, when the light emitting display apparatus according to an embodiment of the present disclosure which does not display an image in the anode reset period ARP is driven at 60 Hz, a period corresponding to the other 60 Hz may be the anode reset period ARP. In this case, the anode reset period ARP may be the same as the refresh period RFP. Such an example is illustrated in FIG. 5. For example, FIG. 5($a$) illustrates the light emitting display apparatus of the related art driven at 120 Hz, and FIG. 5($b$) illustrates the light emitting display apparatus according to an embodiment of the present disclosure driven at 60 Hz. For example, the light emitting display apparatus according to an embodiment of the present disclosure driven as in FIG. 5($b$) may display 60 images for 1 sec. In this case, there may be refresh periods RFP corresponding to a period where 60 images are displayed for 1 sec, and there may be anode reset periods ARP which are the same as the refresh periods RFP.

As another example, in a case where the light emitting display apparatus of the related art displaying an image in the anode reset period ARP illustrated in FIG. 6 is driven at 120 Hz, as illustrated in FIG. 6, when the light emitting display apparatus according to an embodiment of the present disclosure which does not display an image in the anode reset period ARP is driven at 30 Hz, a period corresponding to the other 90 Hz may be the anode reset period ARP. In this case, the anode reset period ARP may be greater than the refresh period RFP. For example, the light emitting display apparatus according to an embodiment of the present disclosure driven as in the embodiment may display 30 images for 1 sec. In this case, there may be refresh periods RFP corresponding to a period where 30 images are displayed for 1 sec, and there may be anode reset periods ARP which are three times longer than the refresh periods RFP.

As another example, in a case where the light emitting display apparatus of the related art displaying an image in the anode reset period ARP illustrated in FIG. 6 is driven at 60 Hz, as illustrated in FIG. 6, when the light emitting display apparatus according to an embodiment of the present disclosure which does not display an image in the anode reset period ARP is driven at 1 Hz, a period corresponding to the other 59 Hz may be the anode reset period ARP. In this case, the anode reset period ARP may be greater than the refresh period RFP. For example, the light emitting display apparatus according to an embodiment of the present disclosure driven as in the embodiment may display one image for 1 sec. In this case, there may be a refresh period RFP corresponding to a period where one image is displayed for 1 sec, and there may be an anode reset period ARP which is 59 times longer than the refresh period RFP.

In the following description, as described above, that the light emitting display apparatus according to an embodiment of the present disclosure is driven at a low frequency may denote that the anode reset period ARP is driven to be greater than or equal to the refresh period RFP. Particularly, that the light emitting display apparatus according to an embodiment of the present disclosure is driven at a low frequency may denote that the refresh period RFP occurs 30 times or less (30 Hz) for example, or may denote that the refresh period RFP occurs 60 times or less (60 Hz) for 1 sec as illustrated in FIG. 5(b).

In a case where the light emitting display apparatus of the related art including pixel driving circuits configured with only P-type LTPS transistors operates in a method described above with FIG. 6, the luminance of the anode reset period ARP may be reduced compared to the refresh period RFP, and due to this, flickers may occur.

For example, light corresponding to a data voltage Vdata may be emitted from the light emitting device ED in the refresh period RFP, and an emission state of the light emitting device ED may be maintained up to the anode reset period ARP. However, the luminance of the anode reset period ARP may more increase than that of the refresh period RFP based on a characteristic of P-type LTPS, and due to this, flickers may occur. For example, flickers may occur due to a luminance deviation between the refresh period RFP and the anode reset period ARP.

In an embodiment of the present disclosure, in order to prevent the occurrence of flickers, as illustrated in FIG. 6, the anode reset voltage Vpark which affects the gate of the driving transistor Tdr in the anode reset period ARP may be set to be higher than the initial voltage Vint which is input to the gate of the driving transistor Tdr in the refresh period RFP.

The initial voltage Vint may be set to one of −10 V to 0 V.

In this case, the anode reset voltage Vpark should be higher than the initial voltage Vint, and thus, when the initial voltage Vint is set to one of −10 V to 0 V, the anode reset voltage Vpark may be set to one of 0 V to 10 V.

Moreover, the anode reset voltage Vpark may be set to a voltage which is lower than the first voltage VDD.

In the anode reset period ARP, a compensation gate pulse CGP may be supplied to each of gate lines at least once. The compensation gate pulse CGP may be a signal which is the same as the gate pulse GP supplied to each of the gate lines in the refresh period RFP.

Figure 7:
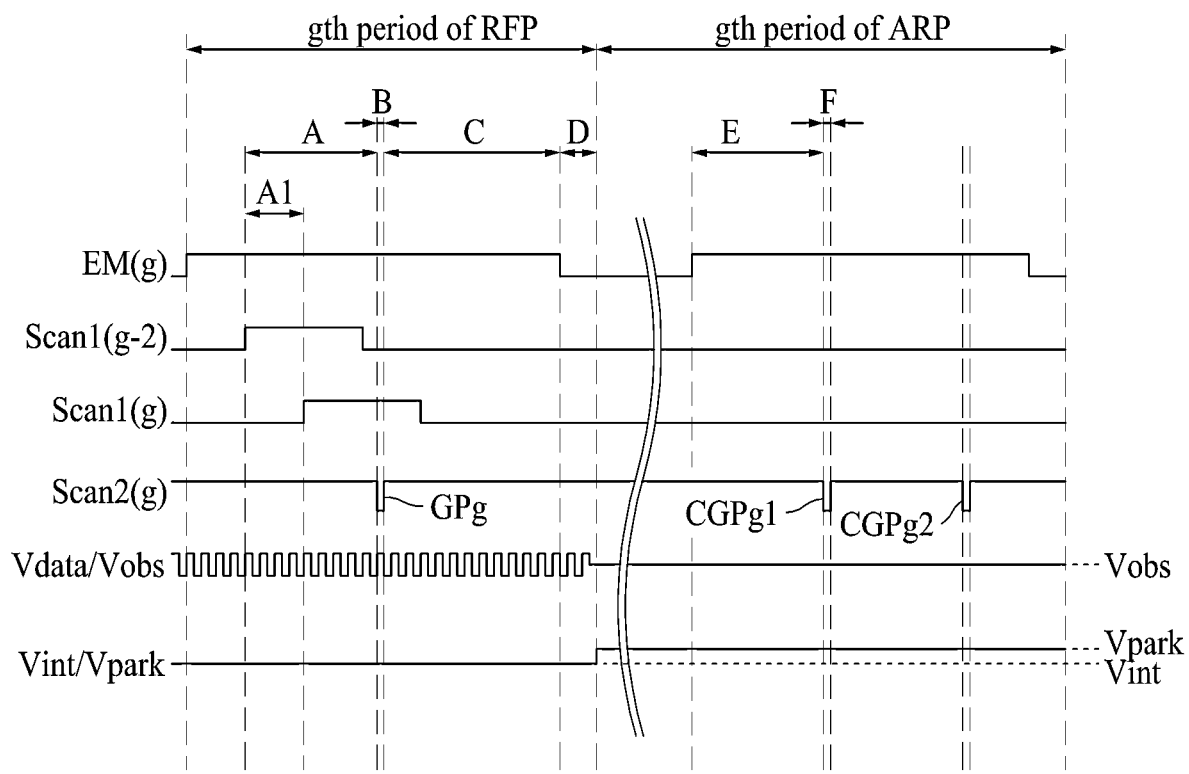
FIG. 7 illustrates a refresh period and an anode reset period corresponding to a gth gate line.
Figure 12:
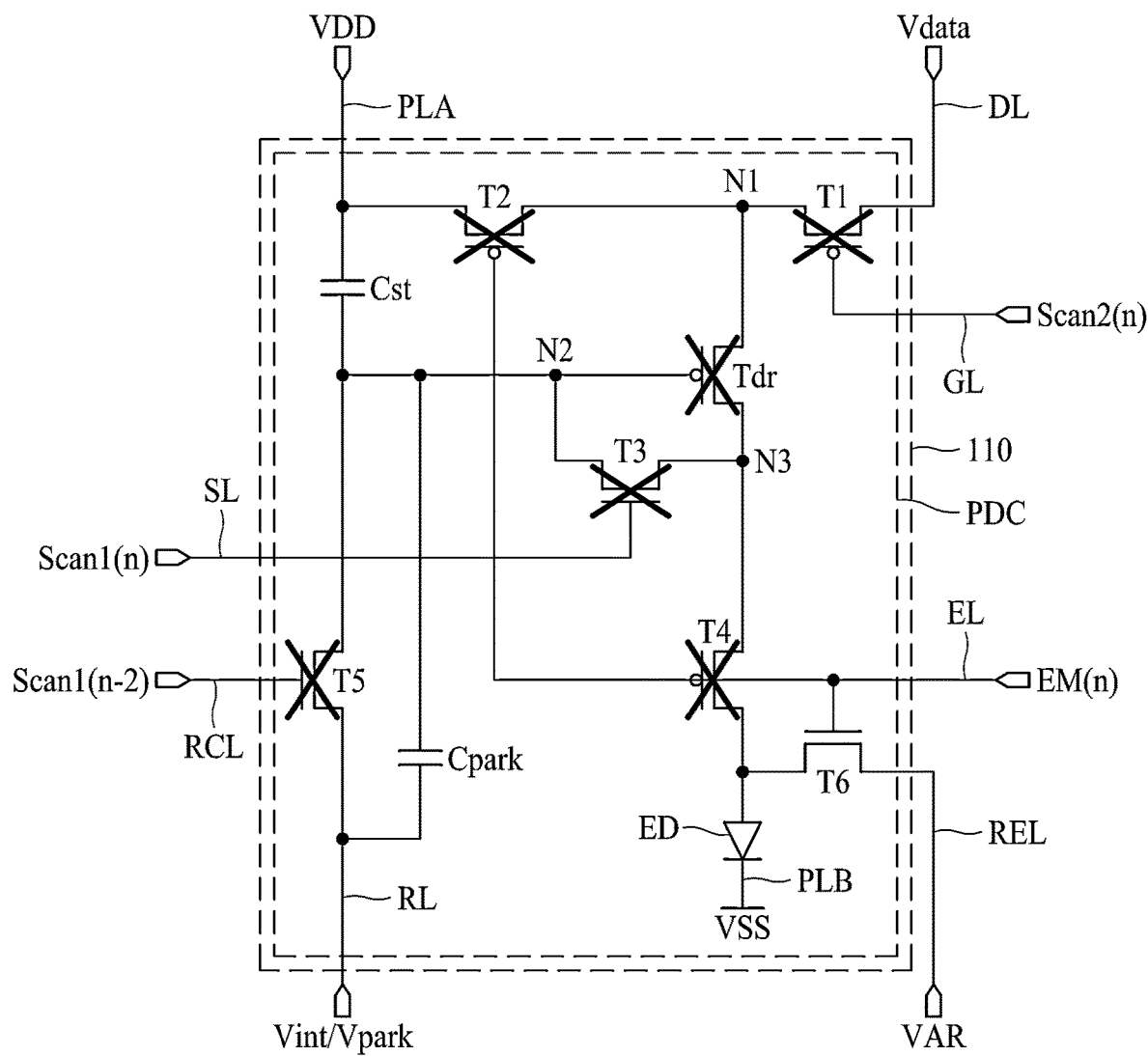
FIGS. 12 and 13 illustrate an operating method of a light emitting display apparatus in an anode reset period, according to an embodiment of the present disclosure.
Figure 13:
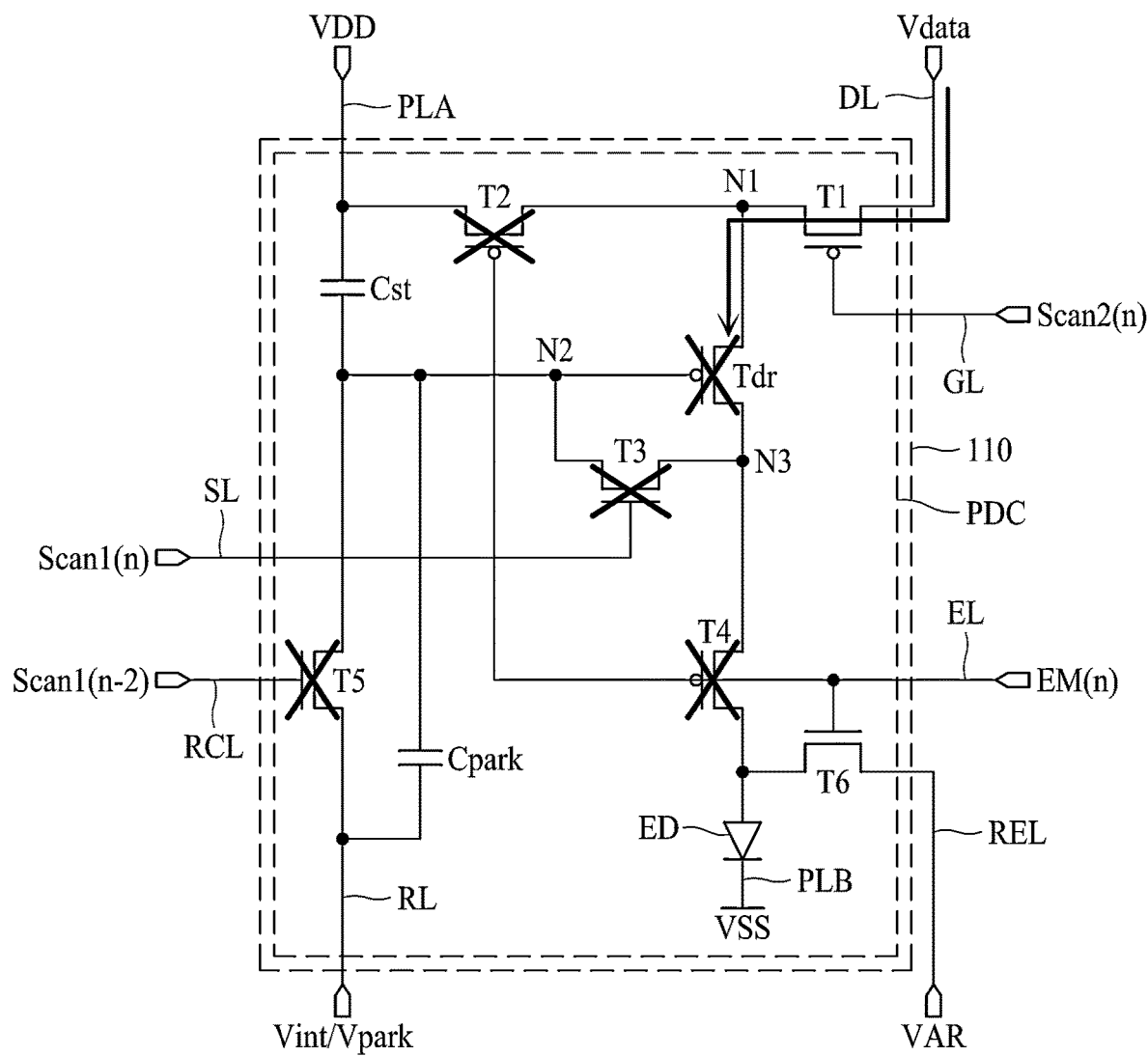
Figure 14:
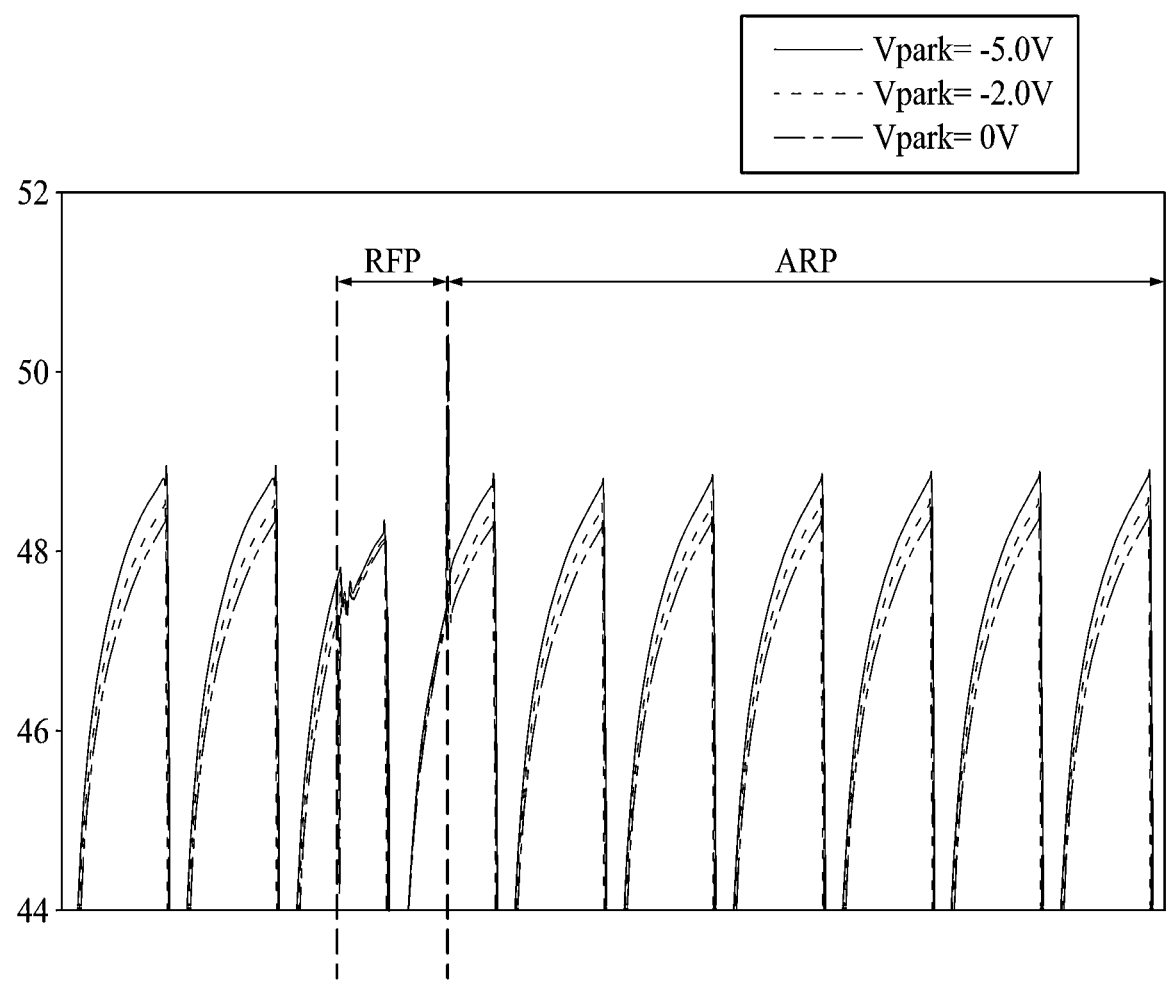
FIG. 14 illustrates an effect of a light emitting display apparatus according to an embodiment of the present disclosure.

FIG. 7 illustrates a refresh period and an anode reset period corresponding to a gth gate line. FIGS. 8 to 11 illustrate an operating method of a light emitting display apparatus in a refresh period, according to an embodiment of the present disclosure. FIGS. 12 and 13 illustrate an operating method of a light emitting display apparatus in an anode reset period, according to an embodiment of the present disclosure. FIG. 14 illustrates an effect of a light emitting display apparatus according to an embodiment of the present disclosure. A $g^{th}$ period of a refresh period ($g^{th}$ period of RFP) in FIG. 7 may denote a last period of the refresh period RFP illustrated in FIG. 6, namely, a period where a $g^{th}$ gate pulse is supplied to a gth gate line GLg and light is emitted from each of pixels 110 connected to the gth gate line GLg. For example, when the $g^{th}$ period of the refresh period elapses, the anode reset period ARP may start. Also, a $g^{th}$ period of an anode reset period ($g^{th}$ period of ARP) in FIG. 7 may denote a last period of the anode reset period illustrated in FIG. 6, namely, a period where a compensation gate pulse CGP is supplied to the gth gate line GLg. Also, in FIG. 14, the ordinate represents luminance, and the abscissa axis represents a time. In this case, a luminance change in a light emitting display apparatus having the anode reset period ARP which is longer than one refresh period RFP is illustrated in FIG. 14.

In the refresh period RFP, as described above, the gate pulses GP1 to GPg may be sequentially supplied to the gate lines GP1 to GPg, and thus, light may be emitted from each of the light emitting devices ED, whereby the display panel 100 may display one image.

Hereinafter, a method of emitting light by using the light emitting device ED in the $g^{th}$ period of the refresh period RFP will be described. An operation performed in the $g^{th}$ period may be performed in common in all periods included in the refresh period RFP, namely, first to $g^{th}$ periods of the refresh period RFP.

When an initialization period A of the $g^{th}$ period of the refresh period ($g^{th}$ period of RFP) starts, as illustrated in FIG. 7, an emission signal EM(g) having a high level may be supplied to the gate of each of the second transistor T2, the fourth transistor T4, and the sixth transistor T6, a reset control signal Scan1(g−2) having a high level may be supplied to the gate of the fifth transistor T5, a scan signal Scan1(g) having a low level may be supplied to the gate of the third transistor T3, and a gate signal Scan2(g) having a high level may be supplied to the gate of the first transistor T1. The reset control signal Scan1(g−2), the scan signal Scan1(g), the gate signal Scan2(g), and the emission signal EM(g) described below may denote a reset control signal, a scan signal, a gate signal, and an emission signal when n is g in the reset control signal Scan1(n−2), the scan signal Scan1(n), the gate signal Scan2(n), and the emission signal EM(n) described above with reference to FIG. 4.

Based on the signals described above, the fifth transistor T5 and the sixth transistor T6 may be turned on, and the other transistors may be turned off.

Figure 8:
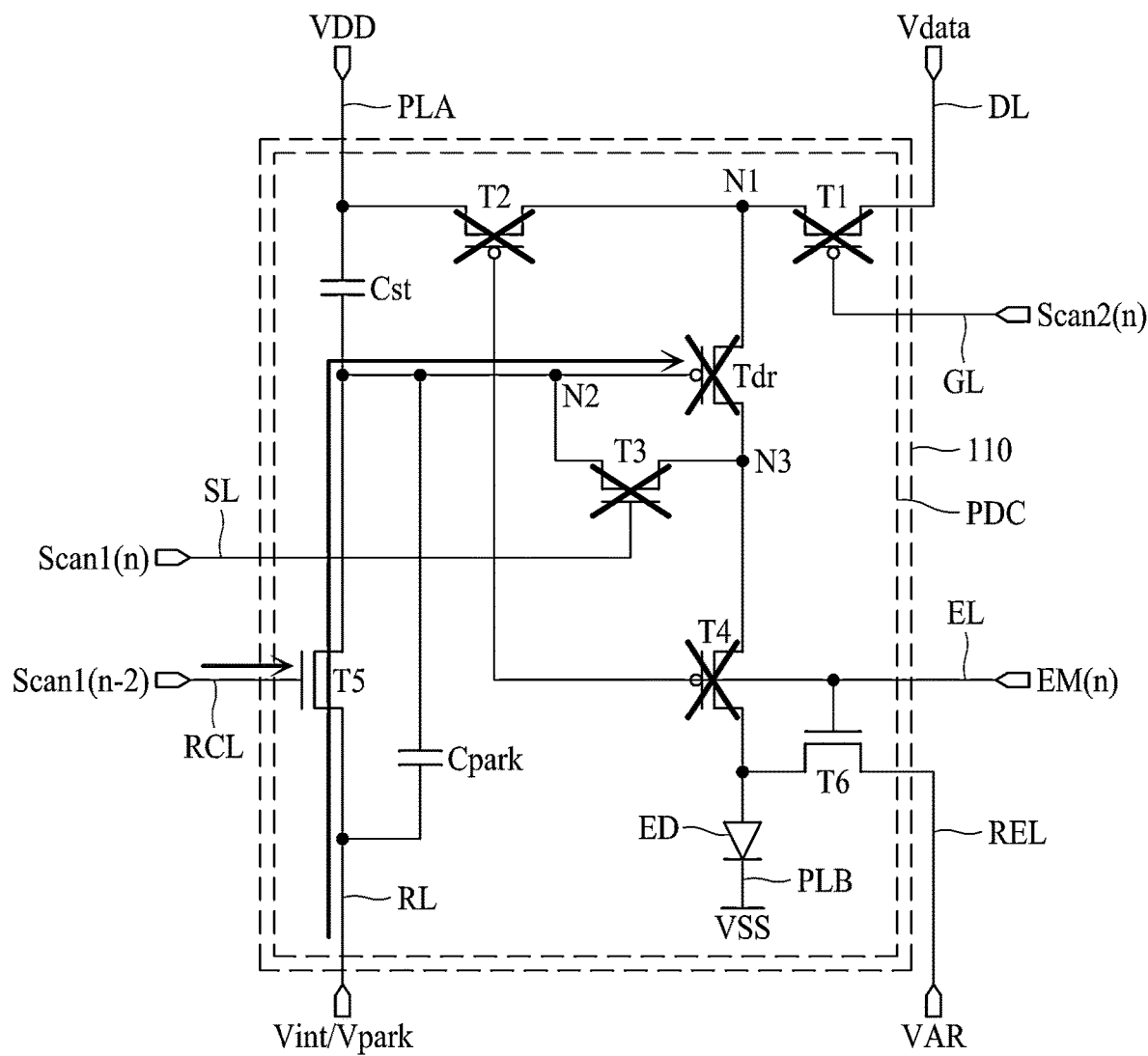
FIGS. 8 to 11 illustrate an operating method of a light emitting display apparatus in a refresh period, according to an embodiment of the present disclosure.

When the fifth transistor T5 is turned on, as illustrated in FIG. 8, the initial voltage Vint may be applied to the gate of the driving transistor Tdr through the fifth transistor T5, and a voltage at the gate of the driving transistor Tdr may be the initial voltage Vint.

For example, a voltage of a second node N2 connected to the gate of the driving transistor Tdr may be the initial voltage Vint.

In this case, an initialization operation described above may be performed in only a period A1 where the reset control signal Scan1(g−2) has a high level and the scan signal Scan1(g) has a low level. However, a voltage at the gate of the driving transistor Tdr may be maintained until a sampling period B after an initialization operation starts. Therefore, as illustrated in FIG. 7, an initialization period A may include some period where the scan signal Scan1(g) has a high level and the sampling period B starts from.

In the initialization period A, the sixth transistor T6 may be turned on, and thus, the first terminal (an anode) of the light emitting device ED may be initialized by the reference voltage VAR.

Subsequently, when the sampling period B of the $g^{th}$ period of the refresh period ($g^{th}$ period of RFP) starts, as illustrated in FIG. 7, the emission signal EM(g) having a high level may be supplied to the gate of each of the second transistor T2, the fourth transistor T4, and the sixth transistor T6, the reset control signal Scan1(g−2) having a low level may be supplied to the gate of the fifth transistor T5, the scan signal Scan1(g) having a high level may be supplied to the gate of the third transistor T3, and the gate signal Scan2(g) having a low level may be supplied to the gate of the first transistor T1. The gate signal Scan2(g) having a low level may denote the gate pulse GPg supplied to the gth gate line.

Therefore, the first transistor T1, the third transistor T3, the sixth transistor T6, and the driving transistor Tdr may be turned on, and the second transistor T2, the fourth transistor T4, and the fifth transistor T5 may be turned off.

Figure 9:
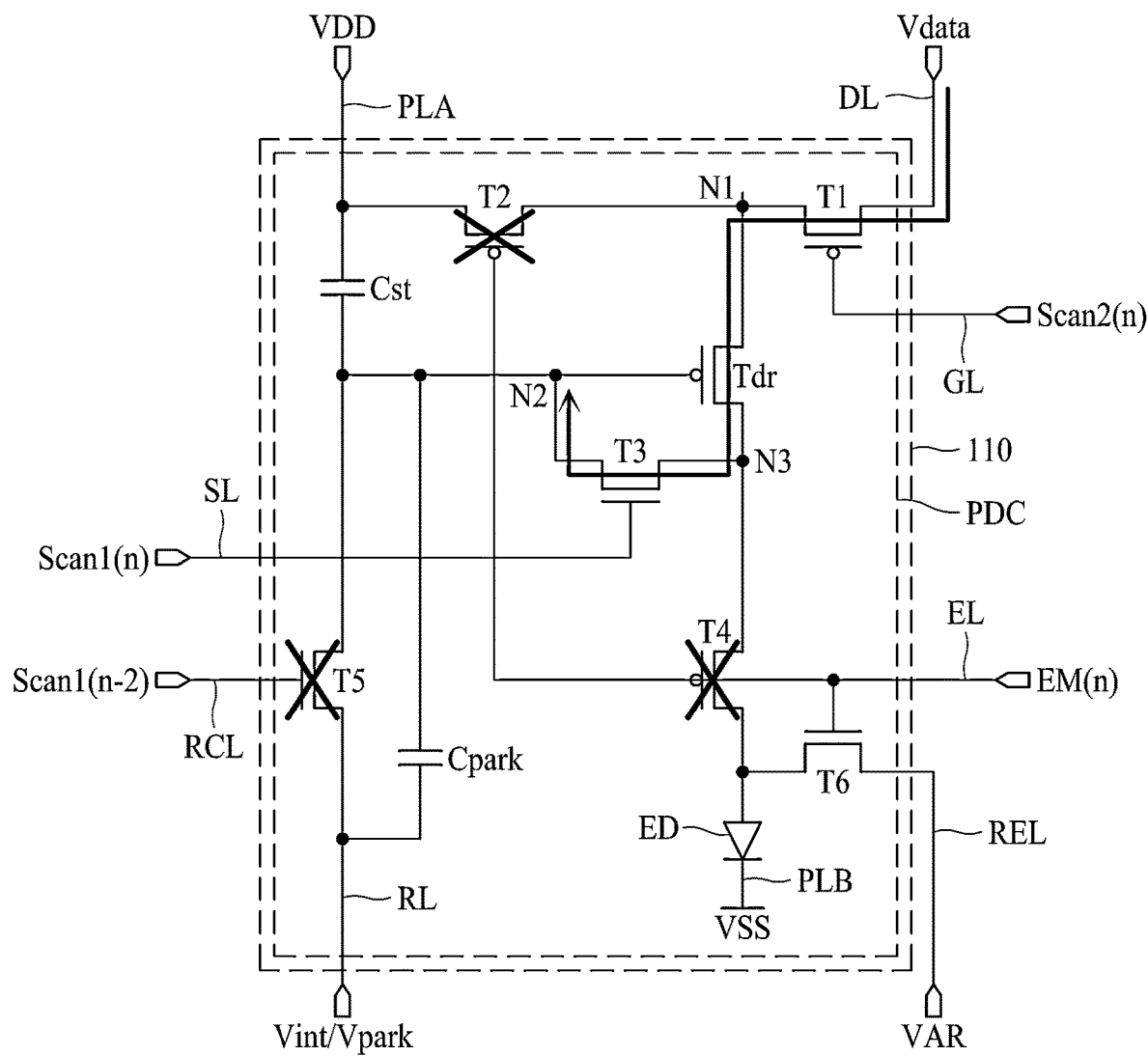

In this case, as illustrated in FIG. 9, the data voltage Vdata supplied through the data line DL may be applied to the gate of the driving transistor Tdr through the first transistor T1, a first node N1, the driving transistor Tdr, a third node N3, and the third transistor T3. Accordingly, a voltage at the gate of the driving transistor Tdr may be changed from the initial voltage Vint to a difference voltage (=Vdata−|Vth|) between the data voltage Vdata and an absolute value (|Vth|) of a threshold voltage. Here, the threshold voltage may denote a threshold voltage of the driving transistor Tdr.

For example, a voltage of the second node N2 connected to the gate of the driving transistor Tdr may be the difference voltage (=Vdata−|Vth|) between the data voltage Vdata and the absolute value (|Vth|) of the threshold voltage.

The initialization period A may be set to be greater than the sampling period B (i.e., a width of the gate pulse GP).

Particularly, a period A1, where the reset control signal Scan1($g$−2) has a high level and the scan signal Scan1($g$) has a low level, of the initialization period A may be set to be greater than the sampling period B.

In the sampling period B, the sixth transistor T6 may be turned on, and thus, a first terminal (an anode) of the light emitting device ED may be continuously initialized by the reference voltage VAR.

Subsequently, when a holding period C of the $g^{th}$ period of the refresh period ($g^{th}$ period of RFP) starts, as illustrated in FIG. 7, the emission signal EM($g$) having a high level may be supplied to the gate of each of the second transistor T2, the fourth transistor T4, and the sixth transistor T6, the reset control signal Scan1($g$−2) having a low level may be supplied to the gate of the fifth transistor T5, the scan signal Scan1($g$) having a high level may be supplied to the gate of the third transistor T3, and the gate signal Scan2($g$) having a high level may be supplied to the gate of the first transistor T1. In this case, the scan signal Scan1($g$) may have a high level immediately after the holding period C starts, and when a certain period elapses, the scan signal Scan1($g$) may have a low level.

Figure 10:
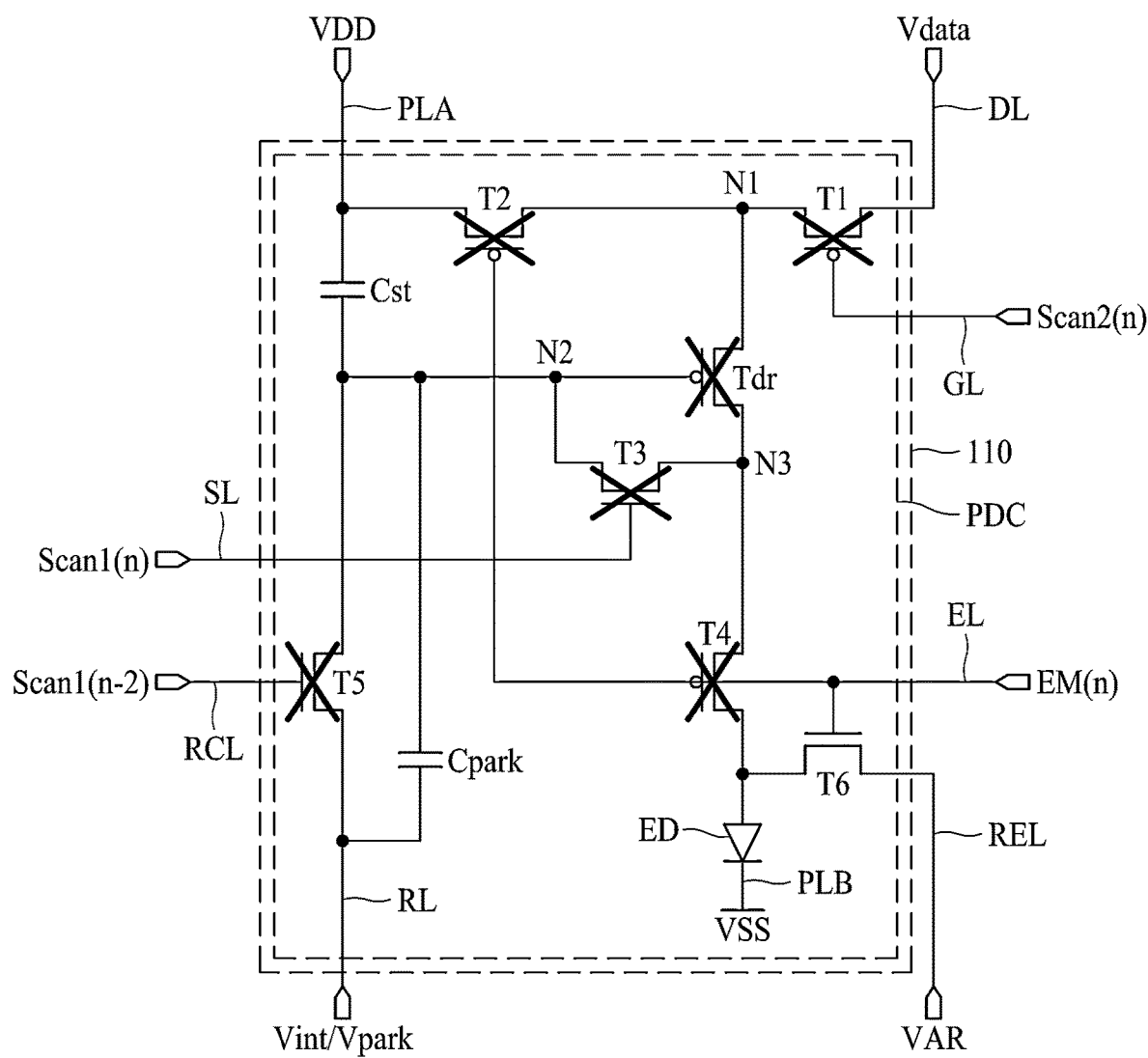

Therefore, in the holding period C, the first to fifth transistors T1 to T5 may be turned off as illustrated in FIG. 10.

Therefore, a voltage of the second node N2 connected to the gate of the driving transistor Tdr may be maintained as the difference voltage (=Vdata−|Vth|) between the data voltage Vdata and the absolute value (|Vth|) of the threshold voltage.

In the holding period C, the sixth transistor T6 may be turned on, and thus, the first terminal (the anode) of the light emitting device ED may be continuously initialized by the reference voltage VAR.

Finally, when an emission period D of the $g^{th}$ period of the refresh period ($g^{th}$ period of RFP) starts, as illustrated in FIG. 7, the emission signal EM($g$) having a low level may be supplied to the gate of each of the second transistor T2, the fourth transistor T4, and the sixth transistor T6, the reset control signal Scan1($g$−2) having a low level may be supplied to the gate of the fifth transistor T5, the scan signal Scan1($g$) having a low level may be supplied to the gate of the third transistor T3, and the gate signal Scan2($g$) having a high level may be supplied to the gate of the first transistor T1.

Figure 11:
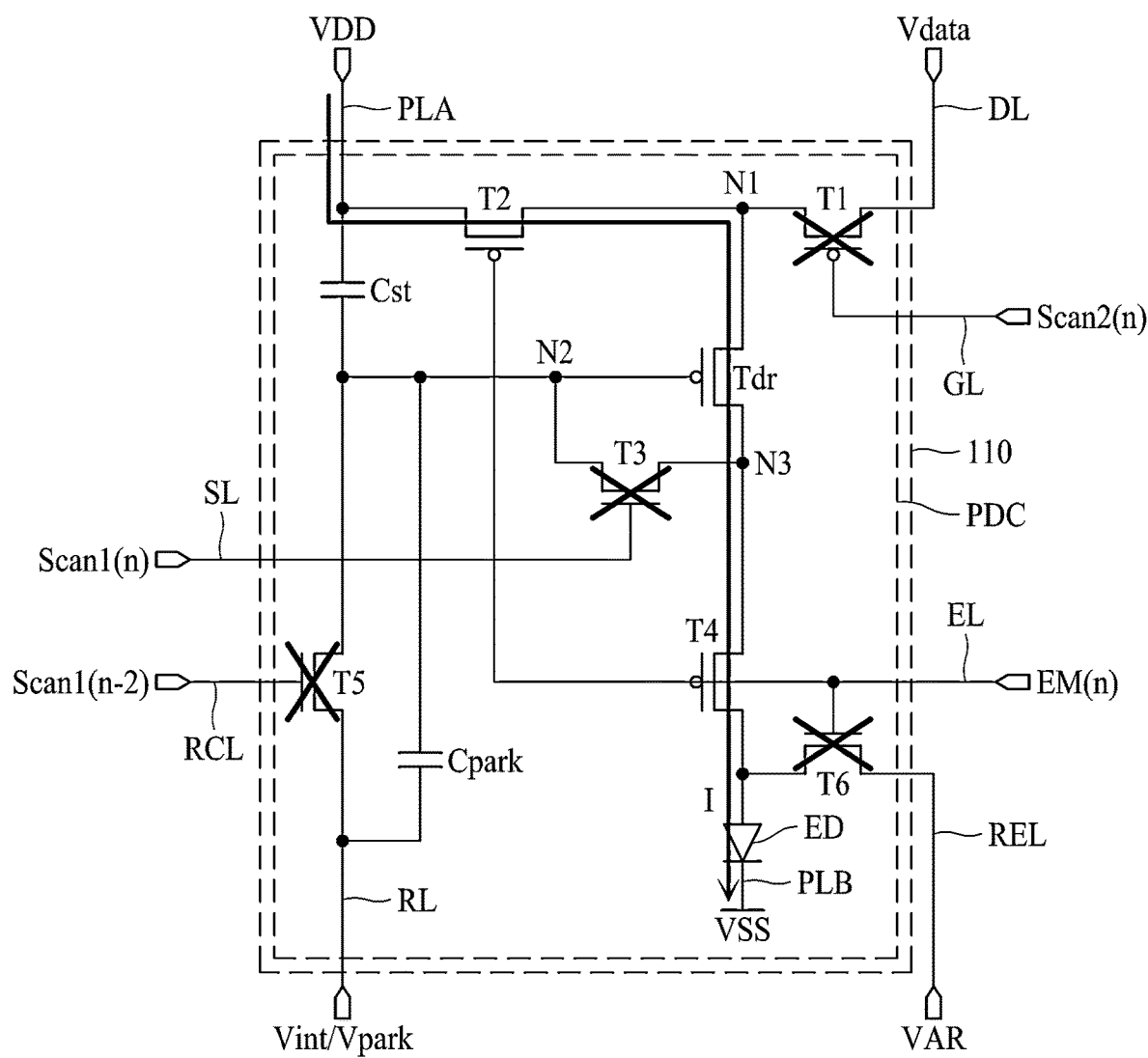

Therefore, the first transistor T1, the third transistor T3, the fifth transistor T5, and the sixth transistor T6 may be turned off, and the second transistor T2 and the fourth transistor T4 may be turned on as illustrated in FIG. 11.

Accordingly, a current I corresponding to the data voltage Vdata may be supplied to the light emitting device ED through the second transistor T2, the driving transistor Tdr, and the fourth transistor T4, and light having luminance corresponding to the data voltage Vdata may be emitted from the light emitting device ED.

In this case, a voltage at the gate of the driving transistor Tdr may be a voltage at a gate in the holding period C (i.e., the difference voltage (=Vdata−|Vth|) between the data voltage Vdata and the absolute value (|Vth|) of the threshold voltage), and a voltage at a source of the driving transistor Tdr (i.e., a voltage at the first terminal of the driving transistor Tdr) may be the first voltage VDD.

The current I flowing in the driving transistor Tdr may be proportional to the square of a voltage (=Vsg−Vth=(VDD−(Vdata−|Vth|))−Vth) obtained by subtracting the threshold voltage Vth of the driving transistor Tdr from a difference voltage Vsg (=VDD−(Vdata−|Vth|)) between the source and the gate of the driving transistor Tdr.

Therefore, the current I which is supplied to the light emitting device ED through the driving transistor Tdr in the emission period D may be expressed as the following Equation 1.

$$I=K(Vsg-Vth)^2=K\{VDD-(Vdata-|Vth|)-Vth)\}^2=K(VDD-Vdata)^2 \quad \text{[Equation 1]}$$

For example, the current I supplied to the light emitting device ED through the driving transistor Tdr may be determined based on the data voltage Vdata and the first voltage VDD and may not be determined by the threshold voltage Vth of the driving transistor Tdr. Here, K may be a constant in which a characteristic of a circuit is reflected.

For example, the driving transistor Tdr may be degraded as the light emitting display apparatus is used for a long time, and thus, the threshold voltage Vth of the driving transistor Tdr may vary.

Moreover, the degrees of degradation of driving transistors Tdr included in the pixels 110 provided in the display panel 100 may be differently changed by various causes.

When the degrees of degradation of the driving transistors Tdr are differently changed, threshold voltages Vth of the driving transistors Tdr may be differently changed.

When the threshold voltages Vth of the driving transistors Tdr are differently changed, levels of currents supplied to the light emitting devices ED through the driving transistors Tdr may vary despite the same data voltages Vdata being supplied to the driving transistors Tdr. Accordingly, the light emitting devices ED included in the pixels 110 supplied with the same data voltage Vdata may emit pieces of light having different brightness.

In order to solve problems described above, the present disclosure may be configured so that the current I flowing in the driving transistor Tdr is not affected by the threshold voltage Vth of the driving transistor Tdr.

For example, in an embodiment of the present disclosure, as expressed in Equation 1, a level of the current I passing through the driving transistor Tdr may not be affected by the threshold voltage of the driving transistor Tdr based on a structure of the pixel 110 illustrated in FIG. 2 and the driving method described above with reference to FIGS. 7 to 11.

Accordingly, according to an embodiment of the present disclosure, even when the driving transistors Tdr are degraded, a normal current corresponding to the data voltage Vdata may be supplied to the light emitting device ED in each pixel 110, and thus, the light emitting device ED may emit light having brightness corresponding to the data voltage Vdata.

As described above, according to an embodiment of the present disclosure, in the refresh period RFP, the luminance of the light emitting device ED may not be affected by the threshold voltage Vth of the driving transistor Tdr. Accordingly, the image quality of the display apparatus may be enhanced.

However, even when the luminance of the light emitting device ED is not affected by a variation of the threshold voltage Vth of the driving transistor Tdr, a problem where luminance increases may occur in the anode reset period ARP due to the hysteresis of the driving transistor Tdr.

In order to solve a problem where luminance increases in the anode reset period ARP, the present disclosure may perform the following operations in the anode reset period ARP.

In the anode reset period ARP, as described above, the anode reset voltage Vpark which is higher than the initial voltage Vint input to the gate of the driving transistor Tdr in the refresh period RFP may be applied to the gate of the driving transistor Tdr, and thus, the luminance of the anode reset period ARP may be maintained at a level which is similar to the luminance of the refresh period RFP. Accordingly, a luminance difference between the luminance of the refresh period RFP and the luminance of the anode reset period ARP may be reduced, and thus, flickers may decrease.

As described above, the gate pulses GP1 to GPg may be sequentially supplied to the gate lines GP1 to GPg in the refresh period RFP, and thus, light may be emitted from each of the light emitting devices ED, whereby the display panel 100 may display one image. In this case, a method where light is emitted from the pixel 110 connected to the gate line as the gate pulse GP is output to the gate line has been described above with reference to FIGS. 7 to 11.

When the refresh period RFP finishes, the anode reset period ARP may start.

Hereinafter, a driving method of a light emitting display apparatus in a $g^{th}$ period of an anode reset period (gth period of ARP) will be described. An operation performed in the $g^{th}$ period of the anode reset period may be performed in common in all periods included in the anode reset period ARP, namely, first to $g^{th}$ periods of the anode reset period ARP.

When a switching period E of the $g^{th}$ period of the anode reset period ($g^{th}$ period of ARP) starts, as illustrated in FIG. 7, the emission signal EM(g) having a high level may be supplied to the gate of each of the second transistor T2, the fourth transistor T4, and the sixth transistor T6, the reset control signal Scan1(g−2) having a low level may be supplied to the gate of the fifth transistor T5, the scan signal Scan1(g) having a low level may be supplied to the gate of the third transistor T3, and the gate signal Scan2(g) having a high level may be supplied to the gate of the first transistor T1.

Therefore, the sixth transistor T6 may be turned on, and the other transistors may be turned off as illustrated in FIG. 12.

In this case, the power supply 500 may supply the anode reset voltage Vpark to the anode reset line RL based on control by the controller 400. For example, the initial voltage Vint may be supplied through the anode reset line RL in the refresh period RFP, and the anode reset voltage Vpark may be supplied in the anode reset period ARF.

The anode reset voltage Vpark, as described above, may be higher than the initial voltage Vint, and for example, may be 0 V.

The anode reset voltage Vpark supplied through the anode reset line RL may affect a voltage at the gate of the driving transistor Tdr. For example, the voltage at the gate of the driving transistor Tdr may be coupled to the anode reset voltage Vpark supplied through the anode reset line RL.

Moreover, the power supply 500 may supply the compensation voltage Vobs to the data line DL based on control by the controller 400. In this case, because the first transistor T1 is turned off, the compensation voltage Vobs may not be supplied to the driving transistor Tdr.

Subsequently, when a compensation period F of the $g^{th}$ period of the anode reset period ($g^{th}$ period of ARP) starts, as illustrated in FIG. 7, the emission signal EM(g) having a high level may be supplied to the gate of each of the second transistor T2, the fourth transistor T4, and the sixth transistor T6, the reset control signal Scan1(g−2) having a low level may be supplied to the gate of the fifth transistor T5, the scan signal Scan1(g) having a low level may be supplied to the gate of the third transistor T3, and the gate signal Scan2(g) having a low level may be supplied to the gate of the first transistor T1.

In the following description, the gate signal Scan2(g) having a low level supplied to the pixel driving circuit PDC in the anode reset period ARP may be referred to as a compensation gate pulse CGP. For example, the gate signal Scan2(g) having a low level supplied in the refresh period may be referred to as a gate pulse GP, and the gate signal Scan2(g) having a low level supplied in the anode reset period ARP may be referred to as a compensation gate pulse CGP.

For example, when the anode reset period ARP starts, the compensation gate pulse CGP may be sequentially supplied to the gate lines GL1 to GLg. To provide an additional description, gate pulses GP may be sequentially supplied to the gate lines GL1 to GLg in the refresh period RFP, and compensation gate pulses CGP may be sequentially supplied to the gate lines GL1 to GLg in the anode reset period ARP.

Based on the compensation gate pulse (the $g^{th}$ compensation gate pulse CGPg) supplied to the gth gate line GLg, the first transistor T1 may be turned on, and thus, the compensation voltage Vobs supplied through the data line DL may be applied to the first terminal of the driving transistor Tdr (i.e., the source of the driving transistor Tdr).

The compensation voltage Vobs may have a voltage which differs from a data voltage Vdata. For example, the compensation voltage Vobs may have one of values, which are 5V less and 5V greater than a maximum value, of data voltages Vdata. For example, the compensation voltage Vobs may be set to a range of ±5.0 V compared to a maximum data voltage Vdata. In an embodiment of the present disclosure, in the anode reset period ARP, a compensation voltage Vobs which differs from the data voltage Vdata may by supplied to the driving transistor Tdr through the first transistor (T1) at least once.

Based on the compensation voltage Vobs, an absolute value (|Vsg|) of a source-gate voltage Vsg of the driving transistor Tdr may decrease, and thus, the luminance of the anode reset period ARP may decrease by a magnitude which is similar to the luminance of the refresh period RFP.

For example, a phenomenon where a hysteresis curve of the threshold voltage Vth of the driving transistor Tdr concentrates in one direction may be prevented by the compensation voltage Vobs, and thus, the luminance of the anode reset period ARP may decrease by a magnitude which is similar to the luminance of the refresh period RFP.

In the light emitting display apparatus of the related art, because the compensation voltage Vobs is not supplied in the anode reset period ARP, the luminance of the anode reset period ARP may more increase than the luminance of the refresh period RFP. For example, in the light emitting display apparatus of the related art, the luminance of the anode reset period ARP may more increase than luminance illustrated in FIG. 14. Due to this, in the light emitting display apparatus of the related art, a very large difference between the luminance of the anode reset period ARP and the luminance of the refresh period RFP may occur, and due to this, flickers may occur.

On the other hand, according to an embodiment of the present disclosure, when the compensation voltage Vobs is supplied to the source of the driving transistor Tdr in the anode reset period ARP, as illustrated in FIG. 14, a difference between the luminance of the anode reset period ARP and the luminance of the refresh period RFP may decrease. Accordingly, in the light emitting display apparatus according to an embodiment of the present disclosure, flickers may be reduced.

Moreover, in an embodiment of the present disclosure, based on the anode reset voltage Vpark supplied through the anode reset line RL in the anode reset period ARP, a difference between the luminance of the anode reset period ARP and the luminance of the refresh period RFP may more decrease.

For example, according to an embodiment of the present disclosure, a variation of the threshold voltage Vth of the driving transistor Tdr may be compensated for by applying the compensation voltage Vobs to the source of the driving transistor Tdr, and thus, an increase in luminance of the anode reset period ARP may be primarily prevented. Also, by applying the anode reset voltage Vpark to the gate of the driving transistor Tdr, an increase in luminance of the anode reset period ARP may be secondarily prevented.

To provide an additional description, an absolute value of the source-gate voltage Vsg of the driving transistor Tdr may be reduced by the compensation voltage Vobs and the anode reset voltage Vpark, and thus, an increase in luminance of the anode reset period ARP may be prevented. For example, according to an embodiment of the present disclosure, in the anode reset period ARP, because the compensation voltage Vobs and the anode reset voltage Vpark are applied to the driving transistor Tdr, a phenomenon where the hysteresis of the driving transistor Tdr is changed may be prevented, and thus, an increase in luminance of the anode reset period ARP may be prevented.

In this case, as illustrated in FIG. 14, a luminance increase width when the anode reset voltage Vpark is −2 V may be less than a luminance increase width when the anode reset voltage Vpark is −5 V, and a luminance increase width when the anode reset voltage Vpark is 0 V may be less than a luminance increase width when the anode reset voltage Vpark is −2 V. Accordingly, as the anode reset voltage Vpark increases, a luminance increase width may decrease, and thus, a luminance difference may be reduced.

Finally, at least two compensation gate pulses CGP may be supplied to one gate line GL.

For example, in the anode reset period ARP, one compensation gate pulse CGP may be input to a gate line GL, but as illustrated in FIG. 7, two compensation gate pulses CGPg1 and CGPg2 may be input or three or more compensation gate pulses may be input.

For example, a first compensation gate pulse CGPg1 may be supplied from the gate driver 200 to a first gate line GL1 based on a start signal transferred from the controller 400 to the gate driver 200, and the first compensation gate pulse CGPg1 may be sequentially supplied to the other gate lines GL based on the first compensation gate pulse CGPg1. Accordingly, the first compensation gate pulse CGPg1 may also be supplied to the gth gate line GLg.

When a predetermined period elapses after the first compensation gate pulse CGPg1 is supplied to the first gate line GL1, the controller 400 may transfer another start signal to the gate driver 200.

A second compensation gate pulse CGPg2 may be supplied from the gate driver 200 to the first gate line GL1 based on another start signal, and another second compensation gate pulse CGPg2 may be sequentially supplied to the other gate lines GL based on the second compensation gate pulse CGPg2. Accordingly, the second compensation gate pulse CGPg2 may also be supplied to the gth gate line GLg.

The number of compensation gate pulses CGP may be set based on a characteristic of the threshold voltage Vth of the driving transistor Tdr, a characteristic of a hysteresis curve, and the anode reset period ARP.

According to an embodiment of the present disclosure, a difference between the luminance of the anode reset period ARP and the luminance of the refresh period RFP may be reduced by the compensation voltage Vobs and the anode reset voltage Vpark, and thus, flickers may decrease.

For example, the present disclosure may be for reducing flickers which occur in low frequency driving. To provide an additional description, in the refresh period RFP, even when compensation is performed so that a current supplied to the light emitting device ED is not affected by the threshold voltage Vth of the driving transistor Tdr, the hysteresis curve of the driving transistor Tdr may concentrate progressively in one direction as a use time of the light emitting display apparatus increases, and due to this, a difference between the luminance of the anode reset period ARP and the luminance of the refresh period RFP may progressively more increase.

In order to decrease a luminance difference caused by the hysteresis of the driving transistor Tdr, in the anode reset period ARP, the present disclosure may supply the anode reset voltage Vpark, which is higher than the initial voltage Vint, to the anode reset capacitor Cpark connected to the gate of the driving transistor Tdr and may supply the compensation voltage Vobs to the source of the driving transistor Tdr.

Accordingly, a difference between the luminance of the anode reset period ARP and the luminance of the refresh period RFP may be reduced, and thus, flickers may decrease.

Figure 15:
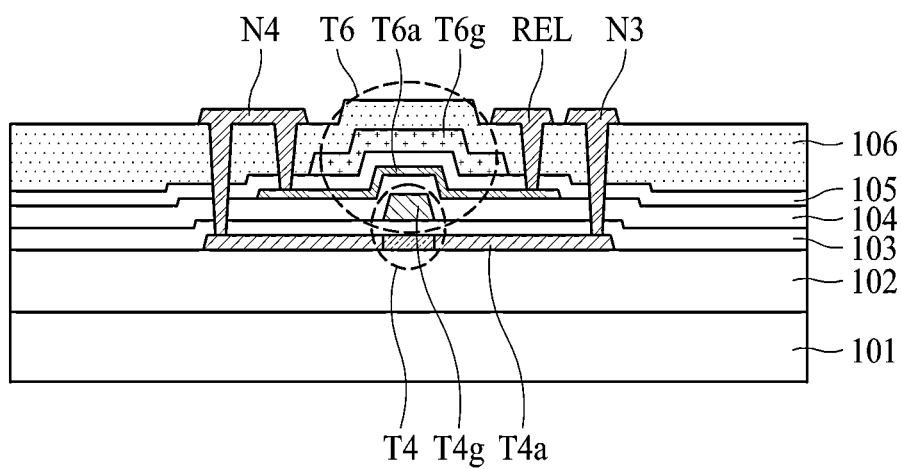
FIG. 15 is a cross-sectional view illustrating a structure of a transistor applied to a light emitting display apparatus according to an embodiment of the present disclosure.

FIG. 15 is a cross-sectional view illustrating a structure of a transistor applied to a light emitting display apparatus according to an embodiment of the present disclosure.

According to an embodiment of the present disclosure, the sixth transistor T6 may be configured as an oxide transistor, and thus, a leakage current may decrease and an RC (Resistor-Capacitor) load of the gate signal Scan2(n) may decrease, whereby a light emitting display apparatus may be driven at a high speed.

For example, in an embodiment of the present disclosure, a transistor causing an image quality defect (for example, a small hot spot and a small dark spot) caused by a leakage current among transistors included in the pixel driving circuit PDC may be configured as an oxide transistor. For example, each of the sixth transistor T6, the fifth transistor T5, and the third transistor T3 may be an n-type oxide transistor.

In this case, in order to increase the degree of integration of the pixel driving circuit PDC, the sixth transistor T6 including an oxide semiconductor and the fourth transistor T4 including LTPS may be formed in a two-layer structure as illustrated in FIG. 15. For example, the sixth transistor T6 may be provided on the fourth transistor T4.

For example, the sixth transistor T6 may be provided on the fourth transistor T4 which includes an active layer T4a provided on a substrate 101 and a buffer 102, a first insulation layer 103 covering the active layer T4a, and a fourth gate electrode T4g provided on the first insulation layer 103. The active layer T4a may be formed of LTPS. A first terminal of the active layer T4a may be connected to a fourth node N4 illustrated in FIG. 2, and a second terminal of the active layer T4a may be connected to a third node N3.

The sixth transistor T6 may include the fourth gate electrode T4g, a second insulation layer 104 covering the fourth gate electrode T4g, an active layer T6a provided on the second insulation layer 104, a third insulation layer 105 covering the active layer T6a, and a sixth gate electrode T6g provided on the third insulation layer 105. Here, the fourth gate electrode T4g and the sixth gate electrode T6g may be gates of the sixth transistor T6. The sixth gate electrode T6g may be covered by fourth insulation layer 106. A first terminal of the active layer T6a may be connected to the fourth node N4 illustrated in FIG. 2, and a second terminal of the active layer T6a may be connected to the third node N3.

According to an embodiment of the present disclosure, an anode reset voltage affecting a gate of a driving transistor in an anode reset period may be higher than an initial voltage which is input to the gate of the driving transistor in a refresh period where a light emitting device is driven to emit light, and thus, flickers may be reduced in a light emitting display apparatus including a pixel circuit which includes an LTPS transistor and an oxide transistor.

Moreover, according to an embodiment of the present disclosure, some of transistors configuring the pixel circuit may each be implemented as an oxide transistor, and thus, an image quality defect (for example, a small hot spot and a small dark spot) caused by a leakage current may be reduced.

Moreover, according to an embodiment of the present disclosure, an RC load of the pixel circuit may decrease, and thus, a light emitting display apparatus may be driven at a high speed and the compensation performance of the light emitting display apparatus may be enhanced.

It will be apparent to those skilled in the art that various modifications and variations can be made in the light emitting display apparatus of the present disclosure without departing from the technical idea or scope of the disclosures. Thus, it is intended that the present disclosure cover the modifications and variations of this disclosure provided they come within the scope of the appended claims and their equivalents.

What is claimed is:

1. A light emitting display apparatus, comprising:
   a pixel driving circuit including a driving transistor and an anode reset capacitor connected to a gate of the driving transistor; and
   a light emitting device configured to emit light with a current supplied through the driving transistor,
   wherein an anode reset period, where a data voltage is not supplied to the driving transistor, is between refresh periods where the light emitting device emits the light with the data voltage supplied to the driving transistor, and
   an anode reset voltage supplied to the anode reset capacitor in the anode reset period is higher than an initial voltage which is input to the gate of the driving transistor in the refresh period.

2. The light emitting display apparatus of claim 1, wherein, in the refresh period, the data voltage is supplied to the driving transistor through a first transistor connected to a first terminal of the driving transistor, and
   wherein, in the anode reset period, a compensation voltage which differs from the data voltage is supplied to the driving transistor through the first transistor at least once.

3. The light emitting display apparatus of claim 1, wherein, when the initial voltage is one of −10 V to 0 V, the anode reset voltage is one of 0 V to 10 V.

4. The light emitting display apparatus of claim 1, wherein the pixel driving circuit comprises:
   a first transistor including a first terminal, a gate connected to a gate line, and a second terminal connected to a data line, the driving transistor including a first terminal connected to the first terminal of the first transistor, a second terminal, and the gate;
   a second transistor including a first terminal connected to a first voltage supply line through which a first voltage is supplied, a second terminal connected to the first terminal of the first transistor, and a gate connected to an emission line;
   a third transistor including a first terminal connected to the gate of the driving transistor, a second terminal connected to the second terminal of the driving transistor, and a gate connected to a scan line;
   a fourth transistor including a first terminal connected to the second terminal of the driving transistor, a gate connected to the emission line, and a second terminal connected to the light emitting device;
   a fifth transistor including a first terminal connected to the gate of the driving transistor, a second terminal connected to an anode reset line through which the anode reset voltage is supplied, and a gate connected to a reset control line;
   a sixth transistor including a first terminal connected to the second terminal of the fourth transistor, a second terminal connected to a reference voltage line through which a reference voltage is supplied, and a gate connected to the emission line;
   a storage capacitor provided between the first terminal of the second transistor and the first terminal of the fifth transistor; and
   the anode reset capacitor between the gate of the driving transistor and the second terminal of the fifth transistor.

5. The light emitting display apparatus of claim 4, wherein the initial voltage is applied to the gate of the driving transistor through the fifth transistor, and
   wherein a voltage at the gate of the driving transistor is coupled to the anode reset voltage in the anode reset period.

6. The light emitting display apparatus of claim 4, wherein each of the sixth transistor, the fifth transistor, and the third transistor is an N-type oxide transistor, and
   wherein each of the first transistor, the second transistor, the fourth transistor, and the driving transistor is a P-type low temperature polysilicon transistor.

7. The light emitting display apparatus of claim 6, wherein the sixth transistor is provided on the fourth transistor.

8. The light emitting display apparatus of claim 1, wherein the anode reset period is greater than or equal to the refresh period.

9. The light emitting display apparatus of claim 1, wherein the compensation voltage has one of values, which are 5V less and 5V greater than a maximum value, of data voltages.

* * * * *